(12) United States Patent
Kim et al.

(10) Patent No.: US 9,447,928 B2
(45) Date of Patent: Sep. 20, 2016

(54) LIGHTING DEVICE

(71) Applicant: Seoul Semiconductor Co., Ltd., Ansan-si (KR)

(72) Inventors: Yoo Jin Kim, Ansan-si (KR); Jung Hwa Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/319,954

(22) Filed: Jun. 30, 2014

(65) Prior Publication Data

US 2015/0016110 A1   Jan. 15, 2015

(30) Foreign Application Priority Data

Jun. 28, 2013  (KR) .................. 10-2013-0075717
Jun. 27, 2014  (KR) .................. 10-2014-0079456

(51) Int. Cl.
| | |
|---|---|
| *F21K 99/00* | (2016.01) |
| *H05B 33/08* | (2006.01) |
| *F21V 29/70* | (2015.01) |
| *F21V 23/00* | (2015.01) |
| *F21V 3/04* | (2006.01) |
| *F21Y 101/00* | (2016.01) |

(52) U.S. Cl.
CPC .............. *F21K 9/135* (2013.01); *F21K 9/232* (2016.08); *F21V 23/005* (2013.01); *F21V 29/70* (2015.01); *H05B 33/0824* (2013.01); *F21V 3/0418* (2013.01); *F21V 3/0436* (2013.01); *F21Y 2101/00* (2013.01); *F21Y 2107/40* (2016.08); *F21Y 2115/10* (2016.08); *Y02B 20/383* (2013.01)

(58) Field of Classification Search
CPC ....................................................... F21K 9/135
USPC ................................................. 313/316, 317
See application file for complete search history.

(56) References Cited

U.S. PATENT DOCUMENTS

| | | | | |
|---|---|---|---|---|
| 2001/0014019 | A1* | 8/2001 | Begemann ................. | 362/231 |
| 2006/0193130 | A1* | 8/2006 | Ishibashi .................... | 362/227 |
| 2006/0214179 | A1* | 9/2006 | Cao ............................ | 257/99 |
| 2010/0308739 | A1* | 12/2010 | Shteynberg et al. ...... | 315/193 |
| 2014/0268697 | A1* | 9/2014 | Smith et al. ............... | 362/183 |

FOREIGN PATENT DOCUMENTS

| | | |
|---|---|---|
| EP | 2 267 359 | 5/2012 |
| JP | 2005-243396 | 9/2005 |
| KR | 10-2010-0020786 | 2/2010 |
| KR | 10-2011-0090385 | 8/2011 |
| KR | 10-1194760 | 10/2012 |

* cited by examiner

*Primary Examiner* — Nimeshkumar Patel
*Assistant Examiner* — Christopher Raabe
(74) *Attorney, Agent, or Firm* — H.C. Park & Associates, PLC

(57) ABSTRACT

Disclosed is a lighting device having wide light-distribution characteristics. The lighting device includes a base; a protrusion disposed on the base; and a light emitting module disposed on the protrusion; wherein the light emitting module comprises a plurality of light emitting diodes inclined inward with respect to the a protruding direction of the protrusion. Accordingly, the lighting device can provide wide light-distribution characteristics.

17 Claims, 4 Drawing Sheets

LIGHTING DEVICE

CROSS-REFERENCE(S) TO RELATED APPLICATION

This application claims priority from and the benefit of Korean Patent Application No. 10-2013-0075717, filed on Jun. 28, 2013, and Korean Patent Application No. 10-2014-0079456, filed on Jun. 27, 2014, which is hereby incorporated by reference for all purposes as if fully set forth herein.

BACKGROUND

1. Field

The present invention relates to a lighting device. More particularly, the present invention relates to a lighting device capable of enhancing light-distribution characteristics and luminous efficacy.

2. Discussion of the Background

General light-emitting devices emit light through recombination of electrons and holes between n- and p-type semiconductor layers.

Light-emitting devices are used in various lighting devices as well as display devices. However, since light-emitting devices are configured to emit light in one direction, lighting devices using such light-emitting devices do not satisfy light-distribution characteristics for general lighting devices.

SUMMARY OF THE INVENTION

The present invention is aimed at providing a lighting device having wide light-distribution characteristics.

In addition, the present invention is aimed at providing a lighting device that has excellent heat-dissipation characteristics and can improve assembly and luminous efficiency.

In accordance with one aspect of the present invention, a lighting device includes: a base; a protrusion disposed on the base; and a light emitting module disposed on the protrusion, wherein the light emitting module includes a plurality of light emitting diodes inclined inward with respect to the a protruding direction of the protrusion.

The protrusion may have a tapered upper portion.

The protrusion may have a gradually decreasing width from a bottom to a top thereof.

The protrusion may include first inclined surfaces with different slopes.

The first inclined surfaces may include a plane perpendicular to the base.

The light emitting diodes may be disposed at the tapered upper portion of the protrusion.

The light emitting diodes may be disposed at the tapered upper portion and on side surfaces of the protrusion.

The light emitting diodes may be alternately disposed along the tapered upper portion and the side surfaces of the protrusion.

The light emitting module may further include at least one flexible circuit board corresponding to the side surfaces of the protrusion.

The flexible circuit board includes side surfaces adjacent to each other in a circumferential direction and inclined surfaces extending from the side surfaces.

The base may have a heat-dissipation function.

The protrusion may be integrally formed with the base.

The lighting device may further include a cover coupled to the base to cover the light emitting module.

The lighting device may further include a diffusion section on an internal or external surface of the cover to diffuse light.

The light emitting diodes may be connected to each other in series or parallel depending upon magnitude of input AC power.

The light emitting diodes may be connected to each other in series or parallel depending upon a change in input AC power.

The lighting device may further include a plurality of connection changing units connected between adjacent light emitting diodes to control connection between the light emitting diodes.

The plurality of light emitting diodes may include an AC driving LED and a DC driving LED.

The plurality of light emitting diodes may be composed of a plurality of light emitting diode groups, and the light emitting diode groups may be sequentially operated depending upon magnitude of AC voltage.

The plurality of light emitting diodes may have a multi-cell structure, the multi-cell structure may be composed of a plurality of multi-cell groups, and the multi-cell groups may be sequentially operated depending upon magnitude of AC voltage.

According to embodiments of the invention, the lighting device includes a light emitting module having light emitting diodes inclined inwards with respect to a vertical center line of a main body, thereby providing wide light-distribution characteristics.

In addition, according to the embodiments of the invention, the lighting device includes a flexible circuit board and a protrusion in which first side surfaces and first inclined surfaces make surface-to-surface contact with second side surfaces and second inclined surfaces, respectively, thereby securing excellent heat-dissipation characteristics. Further, in the lighting device according to the embodiments of the invention, the light emitting module includes the flexible circuit board in which the first side surfaces and the first inclined surfaces are assembled through bending, thereby providing excellent assembly efficiency.

Furthermore, in the lighting device according to the embodiments of the invention, first and second light emitting diodes are alternately arranged on the first inclined surfaces and the first side surfaces in a lateral direction, thereby solving a problem of hot spots that can occur at a lateral side of the lighting device.

DETAILED DESCRIPTION OF THE ILLUSTRATED EMBODIMENTS

Figure 1:
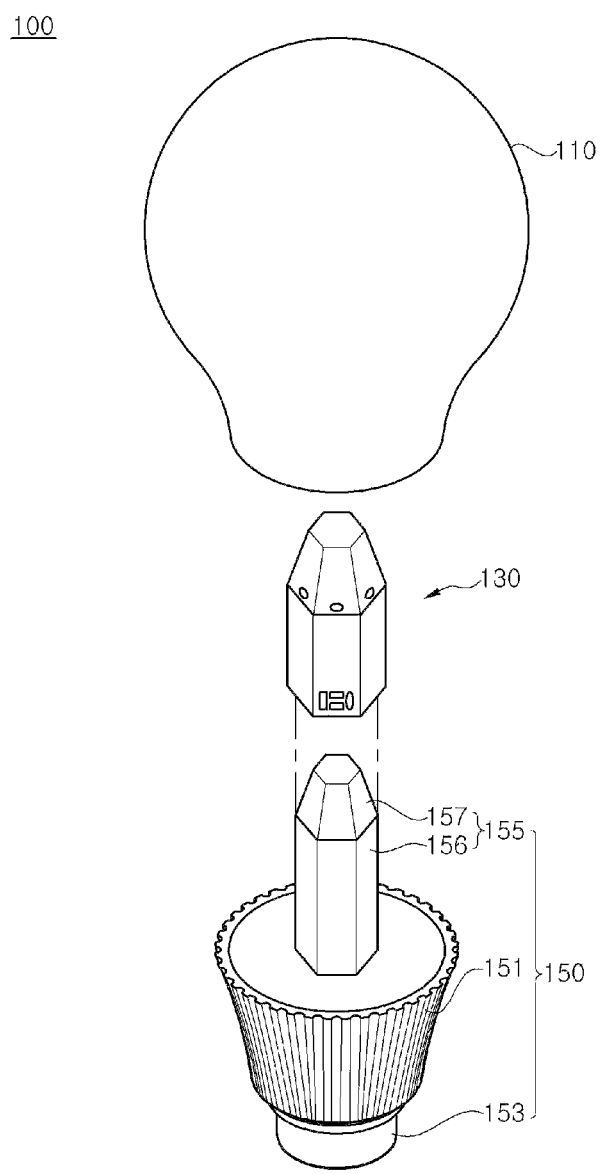
FIG. 1 is an exploded perspective view of a lighting device according to one embodiment of the present invention.

Hereinafter, embodiments of the present invention will be described in detail with reference to the accompanying drawings. The following embodiments are provided as examples so as to fully convey the spirit of the present invention to those skilled in the art. Accordingly, the present invention is not limited to the embodiments disclosed herein and may also be implemented in different forms. In the drawings, width, length, thickness, and the like of components may be exaggerated for convenience. Throughout the present specification, like reference numerals denote like components having the same or similar functions.

Figure 2:
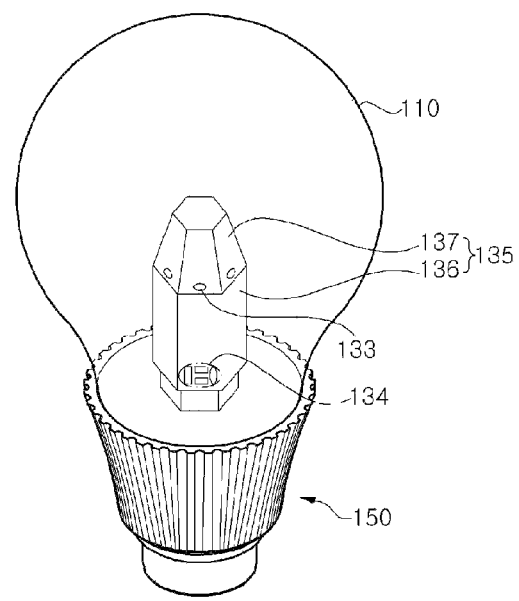
FIG. 2 is a combined perspective view of the lighting device shown in FIG. 1.

FIG. 1 is an exploded perspective view of a lighting device according to an embodiment of the present invention, and FIG. 2 is a combined perspective view of the lighting device shown in FIG. 1.

Referring to FIGS. 1 and 2, a lighting device 100 according to one embodiment of the invention includes a main body 150, a cover 110, and a light emitting module 130.

The light emitting module 130 includes a flexible circuit board 135 and a plurality of light emitting diodes 133.

The flexible circuit board 135 includes a plurality of first side surfaces 136 and a plurality of first inclined surfaces 137. The first side surfaces 136 are adjacent to each other in a circumferential direction and may be bent with respect to boundaries therebetween to form a hexagonal prism.

The first side surfaces 136 have a rectangular shape on a two-dimensional plane, and although not shown, include conductive wire patterns (not shown) for driving the light emitting diodes 133.

The first inclined surfaces 137 extend from the top of the first side surfaces 136. The first inclined surfaces 137 become closer to each other from the bottom to the top thereof. The first inclined surfaces 137 adjoin each other in the circumferential direction. The light emitting diodes 133 are mounted on the first inclined surfaces 137, respectively. Here, although it is illustrated in the present embodiment that one light emitting diode 133 is mounted on the corresponding first inclined surface 137, the number of light emitting diodes 133 mounted on each of the first inclined surfaces 137 may vary.

The plural light emitting diodes 133 are mounted on lower sides of the first inclined surfaces 137 adjacent the first side surfaces 136. Although not limited to particular positions, the light emitting diodes 133 are disposed near boundaries between the first inclined surfaces 137 and the first side surfaces 136 to maximize uniform distribution of emitted-light and light distribution characteristics of the lighting device.

A drive circuit 134 for driving the light emitting diodes 133 is mounted on one of the first side surfaces 136. The drive circuit 134 may be an AC drive circuit for driving the light emitting diodes 133 using AC power. The drive circuit 134 is directly mounted on the flexible circuit board 135, whereby the light emitting module 130 according to the present invention can simplify circuit configuration of the lighting device.

Furthermore, in the light emitting module 130, the light emitting diodes 133 are disposed on the first inclined surfaces 137, thereby providing excellent light distribution characteristics. Here, the light emitting diodes 133 may include an AC driving LED and a DC driving LED. The DC driving LED may be, for example, a red LED. The AC driving LED and the DC driving LED may be included in one light emitting diode 133 or may be separate from each other. The light emitting diodes 133 may be composed of the AC driving LED and the DC driving LED (Red LED) to control color temperature while improving optical characteristics.

The light emitting diodes 133 may be sequentially brought into operation depending upon the magnitude of input AC power. More specifically, the light emitting diodes 133 may be composed of, for example, first to third groups of light emitting diodes, and the first to third groups of light emitting diodes may be sequentially operated depending upon the magnitude of the AC power. That is, the first group may be operated in a first zone between a first forward voltage level and a second forward voltage level, the first and second groups may be operated in a second zone between the second forward voltage level and a third forward voltage level, and the first to third groups may be operated in a third zone between the third forward voltage level and a fourth forward voltage level.

Furthermore, the light emitting diodes 133 may be multi-cell LEDs. The multi-cell LEDs mean that a plurality of cells is arranged to form a plurality of cell groups. In the multi-cell LEDs, the plurality of cell groups may be sequentially operated depending upon the magnitude of input AC power so as to correspond to sequential operation of the plurality of light emitting diode groups.

The main body 150 includes a base 151 and a socket 153 connected to an external power source.

The base 151 is partially exposed to the surroundings and an exposed portion of the base 151 has a concave-convex structure to improve heat dissipation efficiency. The base 151 has a heat dissipation function.

The base 151 further includes a protrusion 155 protruding upward from the base. The protrusion 155 may be integrally formed with the base 151, or may be assembled to the base 151 as a separate component.

The protrusion 155 includes a plurality of second side surfaces 156, a plurality of second inclined surfaces 157, and an upper surface. The second side surfaces 156 adjoin each other in a circumferential direction to form a vertical prism. Although a hexagonal prism having six second side surfaces 156 is exemplified in the present embodiment, the number of second side surfaces 156 may be changed in various ways.

The second side surfaces 156 have a rectangular shape on a two-dimensional plane and correspond to the first side surfaces 136. That is, the first and second side surfaces 136 and 156 make surface-to-surface contact with each other.

The second inclined surfaces 157 extend from upper sides of the second side surfaces 156. The second inclined surfaces 157 correspond to the first inclined surfaces 137. That is, the first and second inclined surfaces 137 and 157 make surface-to-surface contact with each other.

The cover 110 is disposed on the main body 150 and coupled to the main body 150 to cover the light emitting module 130. The cover 110 may further include a diffusion section formed on or provided to an internal or external surface thereof.

The cover 110 is not limited to a particular material and may be formed of, for example, transparent glass, plastic, polypropylene (PP), polyethylene (PE), polycarbonate (PC), or the like.

As such, in the lighting device 100 according to the embodiment of the invention, the light emitting module 130 includes the light emitting diodes 133 inclined inward with respect to the a vertical center line of the main body 150, thereby providing wide light-distribution characteristics.

In addition, according to the embodiment of the invention, the lighting device 100 is provided with the flexible circuit board 135 and the protrusion 155 in which the first side surfaces 136 and the first inclined surfaces 137 make surface-to-surface contact with the second side surfaces 156 and the second inclined surfaces 157, respectively, thereby securing excellent heat-dissipation characteristics. Furthermore, in the lighting device 100 the embodiment of the invention, the light emitting module 130 includes the flexible circuit board 135 in which the first side surfaces and the first inclined surfaces are assembled through bending, thereby providing excellent assembly efficiency.

Figure 3:
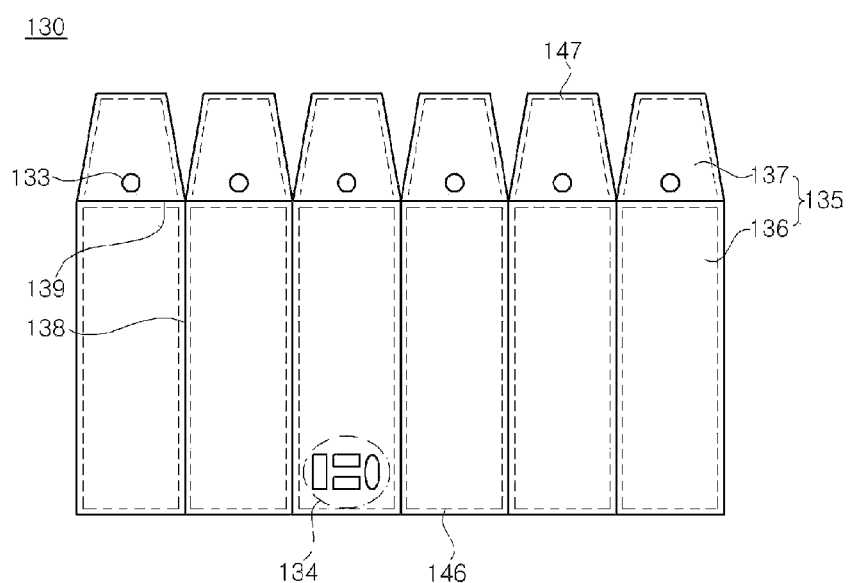
FIG. 3 is a plan view of a light emitting module according to one embodiment of the present invention.

FIG. 3 is a plan view of a light emitting module according to one embodiment of the present invention.

Referring to FIGS. 1 to 3, the light emitting module 130 according to the embodiment of the invention includes a flexible circuit board 135, a plurality of light emitting diodes 133, and a drive circuit 134.

The flexible circuit board 135 includes a plurality of first side surfaces 136 and a plurality of first inclined surfaces 137.

The first side surfaces 136 adjoin each other in a lateral direction and boundaries between the first side surfaces 136 are defined as first boundaries 138.

The plural first inclined surfaces 137 are separated from each other in the lateral direction and adjoin each other when the light emitting module 130 is assembled. Boundaries between the first inclined surfaces 137 and the first side surfaces 136 are defined as second boundaries 139.

The flexible circuit board 135 is provided on one surface thereof with the light emitting diodes 133 and the drive circuit 134. The light emitting diodes 133 are mounted on the first inclined surfaces 137 and disposed close to the second boundaries 139.

The flexible circuit board 135 is provided on the other surface thereof with first metal patterns 146 and second metal patterns 147. The first and second metal patterns 146, 147 transfer heat generated from the light emitting diodes 133 to a protrusion 155. That is, the first and second metal patterns 146, 147 are exposed to the outside through the other surface of the flexible circuit board 135 to make surface-to-surface contact with second side surfaces 156 of the protrusion 155. The first and second metal patterns 146, 147 are coupled to a dielectric layer of the flexible circuit board 135 and separated from the first and second boundaries 138, 139.

In assembly of the light emitting module 130, the plural first side surfaces 136 are bent with respect to the first boundaries 138 to form a hexagonal prism, and the plural first inclined surfaces 137 are bent with respect to the second boundaries 139 to adjoin each other.

As such, in the lighting device 100 according to the embodiment of the invention, the light emitting module 130 includes the light emitting diodes 133 inclined inward with respect to a vertical center line of a main body 150, thereby providing wide light-distribution characteristics.

Furthermore, the lighting device 100 is provided with the flexible circuit board 135 and the protrusion 155 in which the first side surfaces 136 and the first inclined surfaces 137 make surface-to-surface contact with the second side surfaces 156 and the second inclined surfaces 157, respectively, thereby securing excellent heat-dissipation characteristics.

Figure 4:
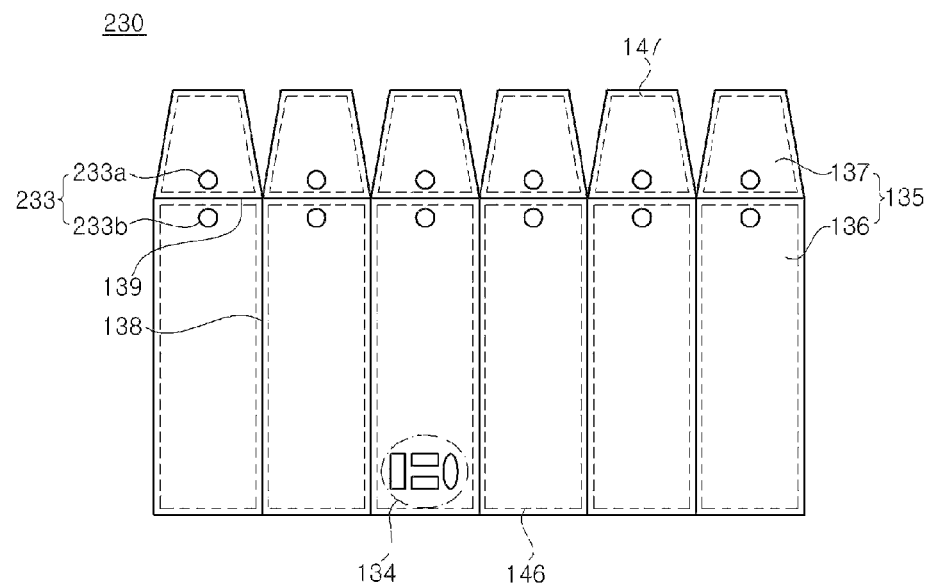
FIG. 4 is a plan view of a light emitting module according to another embodiment of the present invention.

FIG. 4 is a plan view of a light emitting module according to another embodiment of the present invention.

Referring to FIG. 4, except for light emitting diodes 233, the light emitting module 230 according to this embodiment of the invention has the same configuration as that of the light emitting module 130 shown in FIG. 3. Accordingly, the same components are denoted by the same reference numerals and detailed descriptions thereof will be omitted.

The light emitting diodes 233 include a plurality of first light emitting diodes 233a mounted on first inclined surfaces 137 and a plurality of second light emitting diodes 233b mounted on first side surfaces 136.

The first and second light emitting diodes 233a, 233b are disposed adjacent second boundaries between the first inclined surfaces 137 and the first side surfaces 136 to maximize light-distribution characteristics and the intensity of light of a lighting device.

Figure 5:
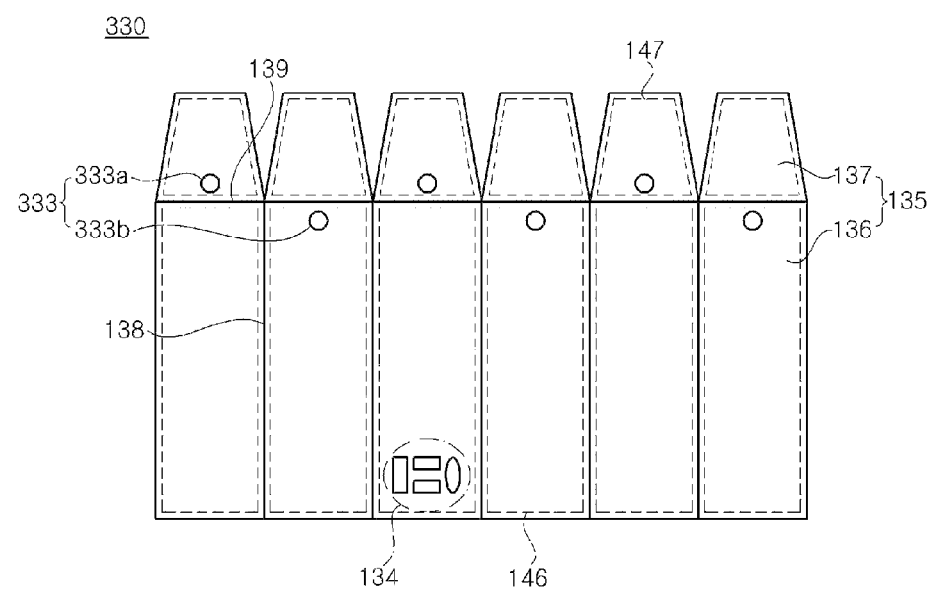
FIG. 5 is a plan view of a light emitting module according to a further embodiment of the present invention.

FIG. 5 is a plan view of a light emitting module according to a further embodiment of the present invention.

Referring to FIG. 5, except for light emitting diodes 333, the light emitting module 330 according to this embodiment of the invention has the same configuration as that of the light emitting module 130 shown in FIG. 3. Accordingly, the same components are denoted by the same reference numerals and detailed descriptions thereof will be omitted.

The light emitting diodes 333 include a plurality of first light emitting diodes 333a mounted on first inclined surfaces 137 and a plurality of second light emitting diodes 233b mounted on first side surfaces 136.

The first and second light emitting diodes 333a, 333b are alternately arranged in a lateral direction. For example, the first light emitting diodes 333a may be mounted only on the odd-numbered first inclined surfaces 137. The second light emitting diodes 333b may be mounted only on the even-numbered first side surfaces 136. In contrast, the first light emitting diodes 333a may also be mounted only on the even-numbered first inclined surfaces 137, and the second light emitting diodes 333b may also be mounted only on the odd-numbered first side surfaces 136.

In addition, the first and second light emitting diodes 333a and 333b may be disposed close to second boundaries 139 between the first inclined surfaces 137 and the first side surfaces 136.

In the light emitting module 330 according to the embodiment of the invention, the first and second light emitting diodes 333a and 333b are alternately arranged on the first inclined surfaces 137 and the first side surfaces 136 in the lateral direction, which makes it possible to solve a problem of hot spots that can happen at a lateral side of the lighting device.

Figure 6:
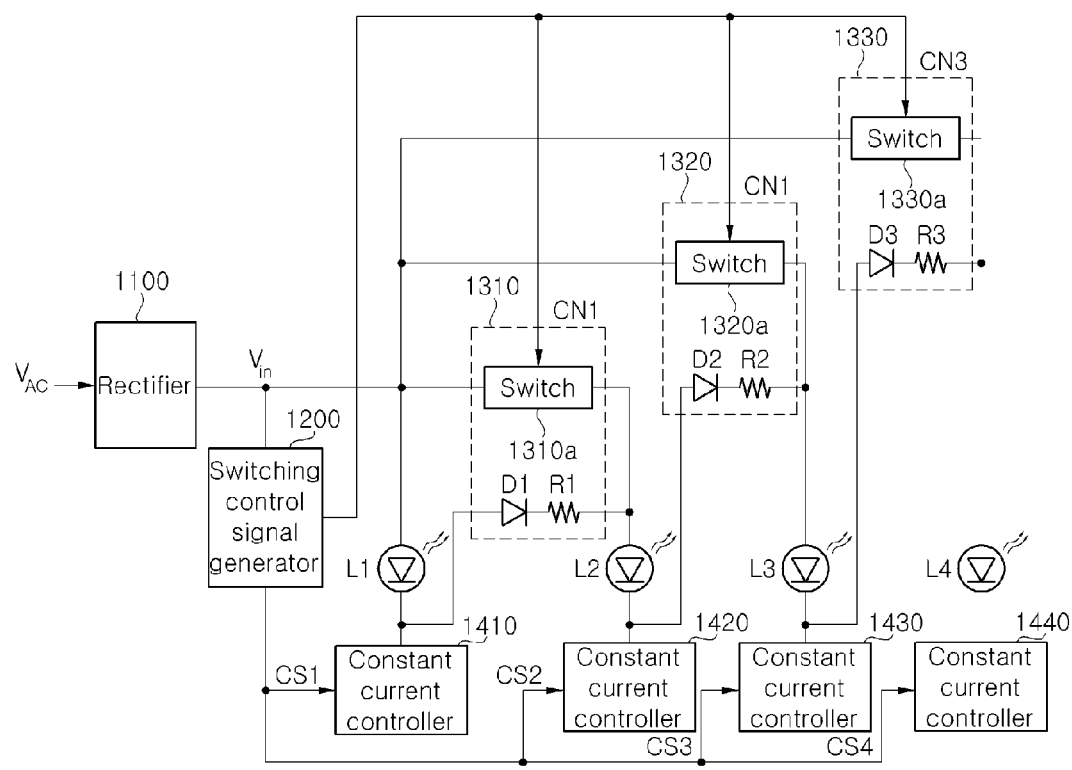
FIG. 6 is a circuit diagram of a drive unit for a lighting device of the present invention.

FIG. 6 is a circuit diagram of a drive unit for a lighting device of the present invention.

Referring to FIG. 6, the drive unit for the lighting device of the present invention includes a plurality of LEDs L1 to L4, a rectifier 1100, a switching control signal generator 1200, a plurality of connection changing units 1310, 1320, 1330, and a plurality of constant current controllers 1410, 1420, 1430, 1440.

The rectifier 1100 rectifies input AC voltage ($V_{AC}$) to generate driving voltage ($V_{in}$). For example, the rectifier 1100 may be a bridge diode.

The switching control signal generator 1200 generates switching control signals using the driving voltage and dimming signals, and the switching control signals include a plurality of connection control signals CN1 to CN3 and a plurality of current control signals CS1 to CS4.

The connection changing units 1310, 1320, 1330 may be connected between two adjacent LEDs of the plurality of LEDs L1 to L4, and may transform correlations between the LEDs L1 to L4 according to the plurality of connection control signals CN1, CN2, and CN3, respectively. That is, the connection changing units 1310, 1320, and 1330 connect two LEDs at both ends thereof in series or parallel by the connection control signals CN1, CN2, and CN3.

To achieve this, the first connection changing unit 1310 includes a switch 1310a, a diode D1, and a resistor R1. Here, the switch 1310a configures a first connector for connecting the first and second LEDs L1 and L2 in parallel, and the diode D1 and the resistor R1 configure a second connector for connecting the first and second LEDs L1 and L2 in series. The switch 1310a is connected between an anode terminal of the first LED L1 and a cathode terminal of the second LED L2 and is selectively turned on according to the connection control signal CN1. The switch 1310a according to the embodiment of the invention is turned on when the connection control signal CN1 is activated and turned off when the connection control signal CN1 is deactivated. The diode D1 is connected between a cathode terminal of the first LED L1 and one end of the resistor R1. The other end of the resistor R1 is connected to an anode terminal of the second LED L2.

The second connection changing unit 1320 includes a switch 1320a, a diode D2, and a resistor R3. The third connection changing unit 1330 includes a switch 1330a, a diode D3, and a resistor R3. The second and third connection changing units 1320, 1330 are similar to the first connection changing unit 1310, and therefore detailed descriptions thereof will be omitted.

The drive unit of the lighting device may control the switches 1310a, 1320a, 1330a using the plurality of connection control signals CN1 to CN3 and the plurality of current control signals CS1 to CS4 generated by the switching control signal generator 1200 to connect the first to fourth LEDs L1 to L4 in series and parallel.

That is, the drive unit of the lighting device according to the present invention may provide uniform light by changing the connections depending upon change in AC power.

While various embodiments of the present invention have been described, the present invention is not limited to a particular embodiment. In addition, the components described in the specific embodiment may be used for other embodiments in the same or similar ways, without departing from the spirit and the scope of the present invention.

What is claimed is:

1. A lighting device comprising:
    a base;
    a protrusion disposed on the base and protruding upward along a vertical centerline, wherein the protrusion comprises first surfaces in a plane parallel to the centerline, the first surfaces being adjacent the base, and corresponding second surfaces connected to a distal end of each first surfaces and inclined inward toward the vertical centerline at distal ends thereof; and
    a light emitting module disposed on the protrusion, wherein the light emitting module comprises:
        a first group comprising:
            one side surface corresponding to one of the first surfaces and comprising a light emitting diode disposed thereon, and
            one inclined surface corresponding to the corresponding second surface and not comprising a light emitting diode, and
        a second group comprising:
            one side surface corresponding to one of the first surfaces and not comprising a light emitting diode, and
            one inclined surface corresponding to the corresponding second surface and comprising a light emitting diode disposed thereon,
    wherein the first group and the second group are alternately disposed directly adjacent to each other to extend circumferentially around the protrusion.

2. The lighting device of claim 1, wherein the light emitting module further comprises at least one flexible circuit board comprising each first group and each second group.

3. The lighting device of claim 1, wherein the base is configured as a heat-dissipation element.

4. The lighting device of claim 1, wherein the protrusion is integrally formed with the base.

5. The lighting device of claim 1, further comprising: a cover coupled to the base to cover the light emitting module.

6. The lighting device of claim 5, further comprising: a diffusion section disposed on an internal or external surface of the cover to diffuse light.

7. The lighting device of claim 1, wherein the light emitting diodes are connected to each other in series or parallel depending upon magnitude of input AC power.

8. The lighting device of claim 1, wherein the light emitting diodes are connected to each other in series or parallel depending upon a change in input AC power.

9. The lighting device of claim 1, wherein the plurality of light emitting diodes comprises an AC driving LED and a DC driving LED.

10. The lighting device of claim 1, wherein the light emitting diodes each comprise light emitting diode groups, and the light emitting diode groups are configured to be sequentially operated depending upon magnitude of AC voltage.

11. The lighting device of claim 1, wherein the light emitting diodes have a multi-cell structure, the multi-cell structure comprises multi-cell groups, and the multi-cell groups are configured to be sequentially operated depending upon magnitude of AC voltage.

12. A lighting device comprising:
    a base;
    a protrusion disposed on the base and protruding upward along a vertical centerline, wherein the protrusion comprises first surfaces in a plane parallel to the centerline adjacent the base and second surfaces inclined inward toward the vertical centerline at a distal end thereof;
    a light emitting module disposed on the protrusion, wherein:
        the light emitting module comprises a flexible circuit board comprising a plurality of side surfaces adjoining each other in a lateral direction, and a plurality of inclined surfaces vertically adjoining corresponding side surfaces and configured to adjoin each other when assembled on the protrusion,
        the light emitting module comprises light emitting diodes disposed on at least some of the inclined surfaces of the flexible circuit board, and
        the light emitting diodes are connected to each other in series or parallel depending upon a change in input AC power; and
    connection changing units, each connection changing unit comprising a switch connected between adjacent light emitting diodes to control connection between the light emitting diodes.

13. The lighting device of claim 12, wherein the protrusion has a tapered upper portion.

14. The lighting device of claim 13, wherein the protrusion has a gradually decreasing width from a bottom to a top thereof.

15. The lighting device of claim 13, wherein the light emitting diodes are disposed adjacent the tapered upper portion of the protrusion.

16. The lighting device of claim 13, wherein the light emitting diodes are disposed adjacent the tapered upper portion and adjacent first surfaces of the protrusion.

17. The lighting device of claim 13, wherein the light emitting diodes are alternately disposed along the tapered upper portion and first surfaces of the protrusion.

* * * * *